(12) United States Patent
Lee et al.

(10) Patent No.: US 10,047,312 B2
(45) Date of Patent: Aug. 14, 2018

(54) METHOD FOR MANUFACTURING FLUFF SOLID FUEL USING COMBUSTIBLE WASTE

(71) Applicants: JST CO., LTD., Gyunggi-Do (KR); SAMHO ENVIRO-TECH INC., Gyeonggi-do (KR)

(72) Inventors: Jang Kun Lee, Gyeonggi-do (KR); Jong Hyeok Oh, Seoul (KR); Mun Ju Kim, Gyeonggi-do (KR); Dong Hyun Song, Gyeonggi-do (KR); Hyun Kyu Jung, Gyeonggi-do (KR)

(73) Assignees: JST CO., LTD., Gyunggi-Do (KR); SAMHO ENVIRO-TECH INC., Gyeonggi-Do (KR)

( * ) Notice: Subject to any disclaimer, the term of this patent is extended or adjusted under 35 U.S.C. 154(b) by 0 days.

(21) Appl. No.: 15/124,062

(22) PCT Filed: Jun. 9, 2014

(86) PCT No.: PCT/KR2014/005037
§ 371 (c)(1),
(2) Date: Sep. 7, 2016

(87) PCT Pub. No.: WO2015/133682
PCT Pub. Date: Sep. 11, 2015

(65) Prior Publication Data
US 2017/0015920 A1 Jan. 19, 2017

(30) Foreign Application Priority Data
Mar. 7, 2014 (KR) .......................... 10-2014-0027063

(51) Int. Cl.
*C10L 5/46* (2006.01)
(52) U.S. Cl.
CPC .............. *C10L 5/46* (2013.01); *C10L 2290/28* (2013.01); *C10L 2290/40* (2013.01);
(Continued)

(58) Field of Classification Search
CPC ............ C10L 2290/28; C10L 2290/40; C10L 2290/546; C10L 5/46; Y02E 50/10; Y02E 50/30
See application file for complete search history.

(56) References Cited

U.S. PATENT DOCUMENTS

| 7,681,812 B2 * | 3/2010 | Goldmann | .............. B03B 9/061 |
|---|---|---|---|
| | | | 241/24.14 |
| 2012/0187227 A1 * | 7/2012 | Ando | ........................ B03B 5/28 |
| | | | 241/24.28 |

FOREIGN PATENT DOCUMENTS

| CN | 104438050 A | * | 3/2015 |
|---|---|---|---|
| KR | 10-0921691 B1 | | 10/2009 |

(Continued)

OTHER PUBLICATIONS

International Search Report for PCT/KR2014/005037.

*Primary Examiner* — Latosha Hines
(74) *Attorney, Agent, or Firm* — The PL Law Group, PLLC

(57) ABSTRACT

A method of manufacturing a non-molded solid fuel using a combustible waste material includes (a) primarily crushing an inflowing waste material using a bag-tearing and crushing device, (b) separating iron from the primarily crushed waste material using a first magnetic sorter, (c) sorting the waste material, from which the iron is separated, according to the particle size of the waste material using a first oscillating multi-stage particle-size sorter, (d) secondarily crushing the waste material having a large particle size using an impact crusher, (e) separating the iron from the secondarily crushed waste material using a second magnetic sorter, (f) sorting the waste material, from which the iron is separated, according to the weight of the waste material using a wind power
(Continued)

sorter, (g) separating the iron from a light material, and (h) pulverizing the waste material, from which the iron is separated.

12 Claims, 2 Drawing Sheets

(52) U.S. Cl.
CPC ......... *C10L 2290/546* (2013.01); *Y02E 50/10* (2013.01); *Y02E 50/30* (2013.01)

(56) References Cited

FOREIGN PATENT DOCUMENTS

| KR | 10-2010-0078746 | A | 7/2010 |
|----|----|----|----|
| KR | 10-1091118 | B1 | 12/2011 |
| KR | 101091118 | B1 * | 12/2011 |
| KR | 10-1270936 | B1 | 6/2013 |
| KR | 10-1272172 | B1 | 6/2013 |
| KR | 10-2013-0076990 | A | 7/2013 |

* cited by examiner

METHOD FOR MANUFACTURING FLUFF SOLID FUEL USING COMBUSTIBLE WASTE

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2014/005037, filed Jun. 9, 2014, which claims priority to the benefit of Korean Patent Application No. 10-2014-0027063 filed in the Korean Intellectual Property Office on Mar. 7, 2014, the entire contents of which are incorporated herein by reference.

TECHNICAL FIELD

The present invention relates to a method of manufacturing a non-molded solid fuel using a combustible waste material. More particularly, the present invention relates to a method of manufacturing a non-molded solid fuel using a combustible waste material by providing a bag-tearing and crushing device, a first magnetic sorter, a first oscillating multi-stage particle-size sorter, an impact crusher, a second magnetic sorter, a wind power sorter, a third magnetic sorter, and a pulverizer for sorting the added waste material to select the combustible waste material, and also by providing a high-speed inertia pulverizer, a fourth magnetic sorter, a nonferrous metal sorter, and a second oscillating multi-stage particle-size sorter for further sorting the waste material, sorted using the first oscillating multi-stage particle-size sorter, to select portions of the waste material having a small particle size. Thereby, the production yield of the solid fuel relative to the amount of waste material that is added is maximized. Further, a mixture including the waste material, discharged from the high-speed inertia pulverizer, and the heavy material, separated using the wind power sorter, is sorted using the fourth magnetic sorter to select ferrous metals, and the waste material discharged from the fourth magnetic sorter is sorted using the nonferrous metal sorter to select nonferrous metals, thus being capable of realizing a profit.

BACKGROUND ART

There are various methods for treating waste materials generated during industrial processes and domestic waste materials. In accordance with the growing necessity for new regeneration energy as an alternative to fossil fuels, various methods of converting waste materials into solid fuels for use as an energy source have been suggested.

A conventional method of manufacturing a solid fuel using a domestic waste material includes processes of bag-tearing and crushing→sorting using a trammel according to particle size→separation of ferrous metals using magnetic sorting→pulverization using a pulverizer→separation of light and heavy materials for wind power sorting.

Examples of the method of manufacturing the solid fuel include a method that includes sorting the discharged waste material having a small particle size using a disk screen and an oscillating screen corresponding to a desired particle size in order to perform particle-size sorting using the trammel, separating ferrous and nonferrous metals, and transporting the resultant material to a wind power sorter to produce the solid fuel, or a modified method thereof.

However, the conventional method of manufacturing the solid fuel has problems in that since a combustible component is not sufficiently separated from the added waste material, the amount of the solid fuel that is produced relative to the amount of waste material that is added is only about 50%, and in that many unit apparatuses are required, which prohibitively increases initial installation costs.

Further, the separated ferrous and nonferrous metals are discharged in a state of being mixed with the waste material, thus being buried and not producing profit.

SUMMARY

Accordingly, the present invention has been made keeping in mind the above problems occurring in the related art, and an object of the present invention is to provide a method of manufacturing a non-molded solid fuel using a combustible waste material by providing a bag-tearing and crushing device, a first magnetic sorter, a first oscillating multi-stage particle-size sorter, an impact crusher, a second magnetic sorter, a wind power sorter, a third magnetic sorter, and a pulverizer for sorting the added waste material to select the combustible waste material, and also providing a high-speed inertia pulverizer, a fourth magnetic sorter, a nonferrous metal sorter, and a second oscillating multi-stage particle-size sorter for further sorting the waste material, sorted using the first oscillating multi-stage particle-size sorter, to select the waste material having a small particle size. Thereby, the production yield of the solid fuel relative to the amount of waste material that is added is maximized. Further, a mixture including the waste material, discharged from the high-speed inertia pulverizer, and the heavy material, separated using the wind power sorter, is sorted using the fourth magnetic sorter to select ferrous metals, and the waste material discharged from the fourth magnetic sorter is sorted using the nonferrous metal sorter to select nonferrous metals, thus producing a source of revenue.

In order to accomplish the above object, the present invention provides a method of manufacturing a non-molded solid fuel using a combustible waste material. The method includes (a) primarily crushing an inflowing waste material using a bag-tearing and crushing device in order to manufacture the non-molded solid fuel from the combustible waste material, (b) separating iron from the waste material, primarily crushed during the step (a), using a first magnetic sorter, (c) sorting the waste material, from which the iron is separated during the step (b), according to the particle size of the waste material using a first oscillating multi-stage particle-size sorter, (d) secondarily crushing the waste material having a large particle size using an impact crusher after the sorting of the step (c), (e) separating the iron from the secondarily crushed waste material using a second magnetic sorter, (f) sorting the waste material, from which the iron is separated during the step (e), according to the weight of the waste material using a wind power sorter, (g) separating the iron from a light material separated during the step (f) using a third magnetic sorter, and (h) pulverizing the waste material, from which the iron is separated during the step (g), using a pulverizer to manufacture the solid fuel.

Ferrous metals separated using the first, second, and third magnetic sorters during the steps (b), (e), and (g) are mixed with the waste material discharged from the first oscillating multi-stage particle-size sorter and are transported into a high-speed inertia pulverizer.

A portion mixed with the ferrous metals is separated from the waste material and transported to the high-speed inertia pulverizer using the high-speed inertia pulverizer, and the waste material, including components having different properties, is divided according to the properties thereof.

The waste material discharged from the high-speed inertia pulverizer is mixed with a heavy material separated using the wind power sorter, and is sorted using a fourth magnetic sorter to select the ferrous metals.

The waste material discharged from the fourth magnetic sorter is sorted using a nonferrous metal sorter to select nonferrous metals.

The waste material discharged from the nonferrous metal sorter is sorted based on a predetermined particle size using a second oscillating multi-stage particle-size sorter, a portion of the waste material having a particle size smaller than the predetermined particle size is discharged as residue, and a remaining portion of the waste material having a particle size larger than the predetermined particle size is mixed with the waste material discharged from the fourth magnetic sorter and is pulverized using a pulverizer to manufacture a solid fuel.

The first oscillating multi-stage particle-size sorter is provided with a sieve having a predetermined size.

The second oscillating multi-stage particle-size sorter is provided with another sieve that is smaller than the sieve of the first oscillating multi-stage particle-size sorter.

A method of manufacturing a non-molded solid fuel using a combustible waste material according to the present invention has the following effects.

1) An impact crusher may be used to crush the waste material having a predetermined particle size (preferably, a size of 50 to 80 mm) or more, discharged from a first oscillating multi-stage particle-size sorter, into particles having a size of 150 mm or less and to generate impact energy in a hammer mill mode. Therefore, the waste materials mixed with each other may be effectively separated according to the respective properties thereof so as to effectively recover a portion of the waste material, which is discharged from a wind power sorter as heavy material in the conventional method, as a light material, thereby increasing the amount of solid fuel that is manufactured.

2) The waste material having a predetermined particle size (preferably, a size of 50 to 80 mm) or less discharged from the first oscillating multi-stage particle-size sorter may be separated according to the respective properties thereof using a high-speed inertia pulverizer, and may be sorted according to particle size based on a predetermined particle size (preferably, a size of 10 to 30 mm) using a second oscillating multi-stage particle-size sorter to effectively recover waste material having a predetermined particle size or more and containing a large amount of combustible material, thereby increasing the amount of solid fuel that is manufactured.

3) The ferrous metals recovered from a fourth magnetic sorter may be separated from waste material having properties different from those of the ferrous metals using the high-speed inertia sorter to thus realize a profit and increase the relative amount of the combustible waste material that is recovered, thereby overcoming the problems with the conventional method, including mixing of the recovered ferrous metals with waste material having properties different from those of the ferrous metals, which cannot be profitably used, and the recovery of only a small portion of combustible waste material.

DETAILED DESCRIPTION

Figure 1:
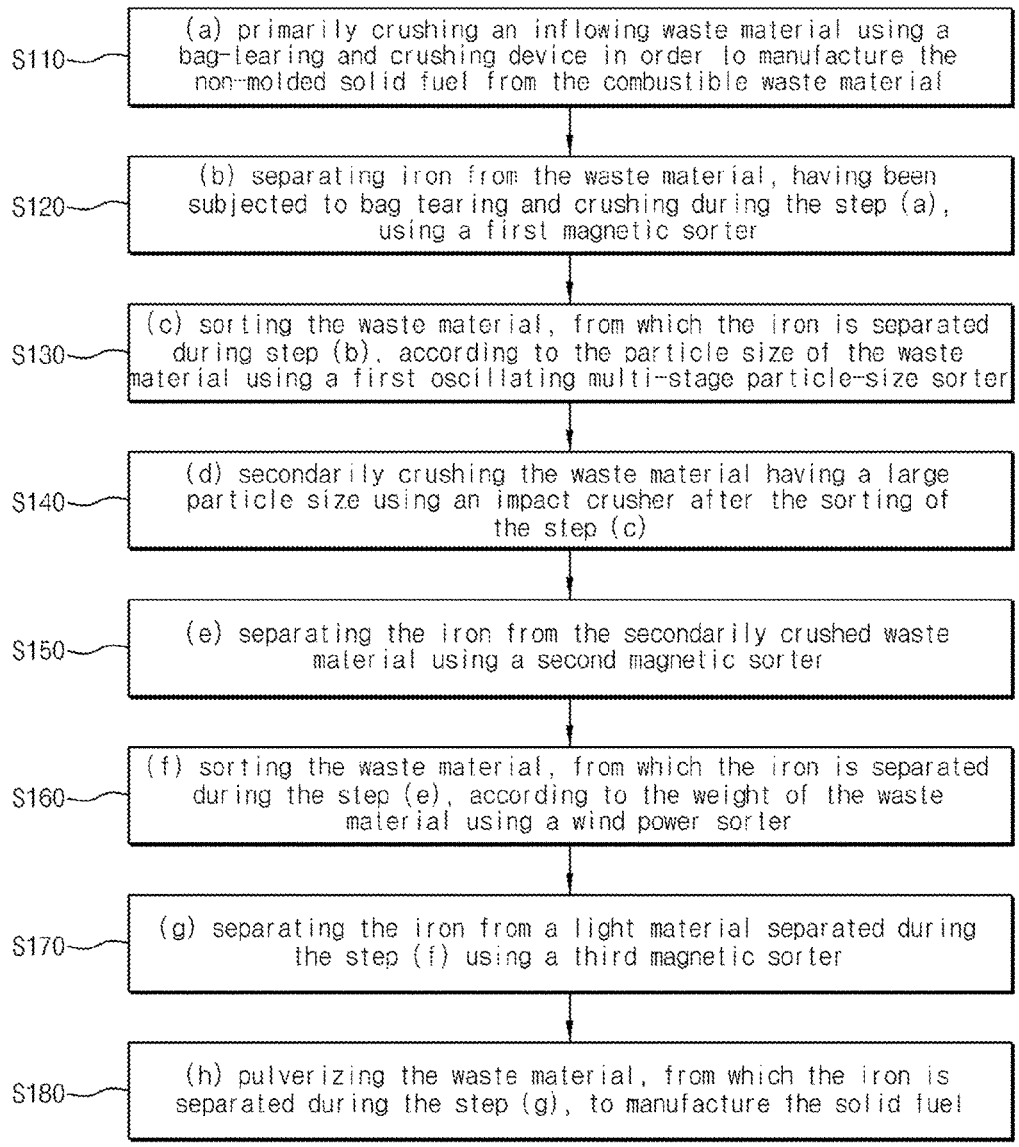
FIG. 1 is a flowchart showing a method of manufacturing non-molded solid fuel using combustible waste material according to the present invention.
Figure 2:
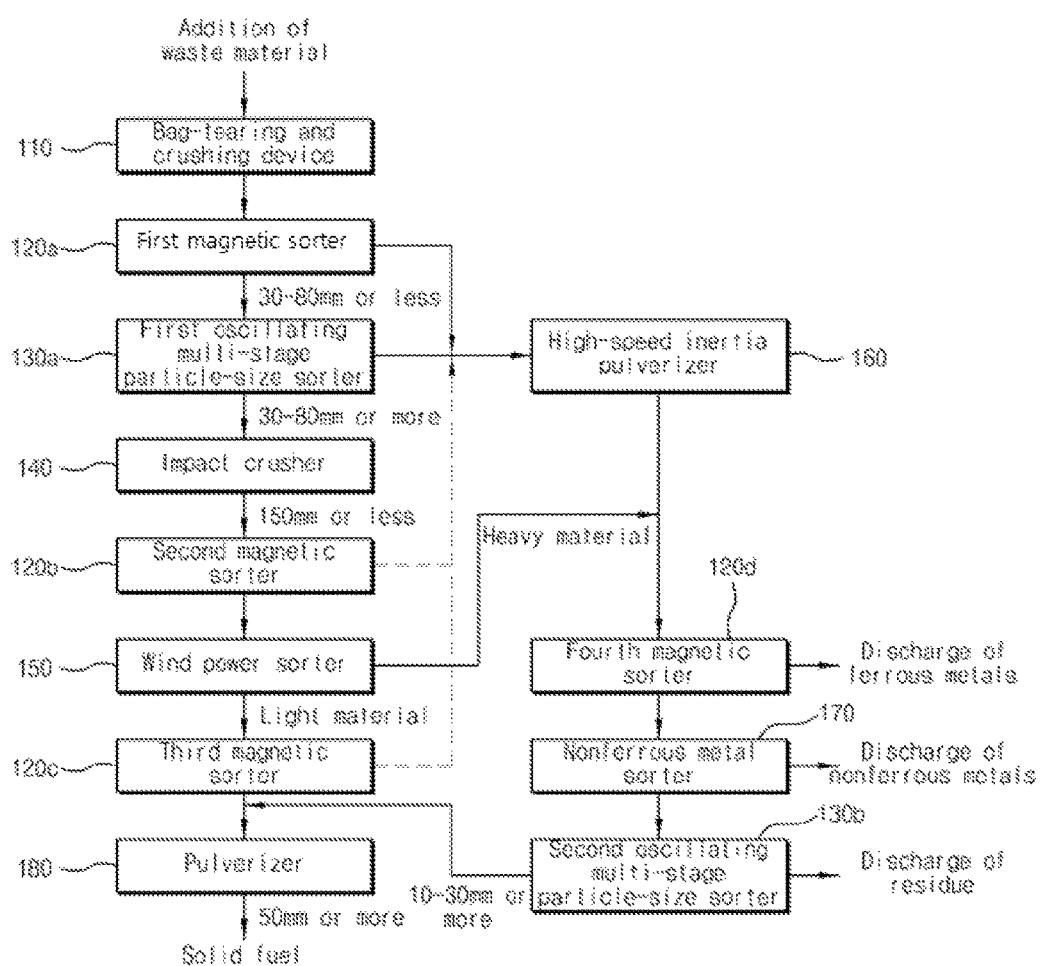
FIG. 2 is a block diagram showing the method of manufacturing non-molded solid fuel using combustible waste material according to the present invention.

The present invention will be described more fully hereinafter with reference to the accompanying drawings, in which embodiments of the present invention are shown so as to be easily understood by those skilled in the related art. Unless defined otherwise, all the terms used in this specification have the same meanings as would be generally understood by those skilled in the related art. If the terms used in this specification and the general meanings of the terms conflict with each other, the terms should be construed as having the same meanings as the definition of this specification. Like reference numerals in the specification denote like elements.

Further, a method of manufacturing a non-molded solid fuel using a combustible waste material disclosed in this specification may be implemented using various embodiments, but is not limited to the embodiments.

The method of manufacturing the non-molded solid fuel using the combustible waste material according to the present invention includes (a) primarily crushing using a bag-tearing and crushing device (S110), (b) separating iron using a first magnetic sorter (S120), (c) particle-size sorting using a first oscillating multi-stage particle-size sorter (S130), (d) secondarily crushing using an impact crusher (S140), (e) separating iron using a second magnetic sorter (S150), (f) weight sorting using a wind power sorter (S160), (g) separating iron using a third magnetic sorter (S170), and (h) manufacturing the solid fuel using a pulverizer (S180).

(a) During primarily crushing using the bag-tearing and crushing device (S110), inflowing waste material, which is in a standard plastic garbage bag used to manufacture the non-molded solid fuel from the combustible waste material, is subjected to bag tearing using a bag-tearing and crushing device 110, and bulky pieces of waste material, such as large pieces of metal and wood, are primarily crushed.

(b) During separation of the iron using the first magnetic sorter (S120), the iron is separated from the waste material, primarily crushed during the step (a), using a first magnetic sorter 120a.

(c) During particle-size sorting using the first oscillating multi-stage particle-size sorter (S130), the waste material, from which the iron is separated during the step (b), is sorted according to the particle size thereof using a first oscillating multi-stage particle-size sorter 130a.

The first oscillating multi-stage particle-size sorter 130a is provided with a sieve (not shown) having a predetermined particle size (preferably, a size of 30 to 80 mm), and the waste material is sorted into a portion having a particle size larger than a predetermined particle size (preferably, a size of 30 to 80 mm) and a remaining portion having a particle size smaller than the predetermined particle size.

(d) During secondarily crushing using the impact crusher (S140), the waste material having the large particle size is secondarily crushed using an impact crusher 140, which generates impact energy in a hammer mill mode, after the sorting of the step (c).

The waste material, which has the particle size larger than the predetermined particle size and which is discharged from the first oscillating multi-stage particle-size sorter 130a, is crushed into parts having a particle size of 150 mm or less using the impact crusher 140 in order to improve the efficiency with which the combustible waste material is selected. The mixed portions of the waste material may be separated based on the properties thereof so as to increase the selection efficiency of the combustible waste material during subsequent processes.

(e) During separation of the iron using the second magnetic sorter (S150), the iron is separated from the secondarily crushed waste material using a second magnetic sorter 120b.

(f) During weight sorting using the wind power sorter (S160), the waste material, from which the iron is separated during the step (e), is sorted according to the weight thereof (heavy and light materials) using a wind power sorter 150.

(g) During separation of the iron using the third magnetic sorter (S170), the iron is separated from the light material separated during the step (f) using a third magnetic sorter 120c.

The waste material discharged from the third magnetic sorter 120c is mixed with the waste material having a particle size of 10 to 30 mm discharged from a second oscillating multi-stage particle-size sorter 130b, and is pulverized into parts having a particle size of 50 mm or less using a pulverizer 180 to manufacture the solid fuel.

The ferrous metals separated using the first, second, and third magnetic sorters 120a, 120b, and 120c during the steps (b), (e), and (g) are mixed with the waste material having the particle size of 30 to 80 mm discharged from the first oscillating multi-stage particle-size sorter 130a, and are transported to a high-speed inertia pulverizer 160.

The ferrous metals are separated from the waste material, transported to the high-speed inertia pulverizer 160, using the high-speed inertia pulverizer 160, and the waste material including components having different properties is divided according to the properties thereof so as to enable easy selection of the combustible waste material during subsequent processes.

The waste material discharged from the high-speed inertia pulverizer 160 is mixed with the heavy material, separated using the wind power sorter 150, and is then sorted using a fourth magnetic sorter 120d to select the ferrous metals.

The ferrous metals selected using the fourth magnetic sorter 120d may be sold without separate treatment, thus producing profit.

The waste material discharged from the fourth magnetic sorter 120d is sorted using a nonferrous metal sorter 170 to select nonferrous metals.

The nonferrous metals selected using the nonferrous metal sorter 170 may be sold without separate treatment, thus producing profit.

The waste material discharged from the nonferrous metal sorter 170 is sorted based on a predetermined particle size (preferably, a size of 10 to 30 mm) using the second oscillating multi-stage particle-size sorter 130b.

A portion of the waste material having a particle size smaller than the predetermined particle size mainly consists of incombustible materials, such as earth and sand components, and thereby is discharged as residue. The remaining portion of the waste material, having a particle size larger than the predetermined particle size, contains a large amount of combustible material and is thus mixed with the waste material discharged from the fourth magnetic sorter 120d.

The second oscillating multi-stage particle-size sorter 130b is provided with a sieve having a predetermined size (preferably, a size of 10 to 30 mm) to sort the waste material according to the particle size thereof.

After the aforementioned procedure, (h) during the manufacture of the solid fuel using the pulverizer (S180), the waste material, from which the iron was separated during the step (g), is pulverized using the pulverizer 180 to manufacture solid fuel which has a particle size of 50 mm or less and which is used to produce electricity and steam.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of manufacturing a non-molded solid fuel using a combustible waste material, the method comprising:
    (a) primarily crushing an inflowing waste material using a bag-tearing and crushing device in order to manufacture the non-molded solid fuel from the combustible waste material;
    (b) separating iron from the waste material primarily crushed during the step (a) using a first magnetic sorter;
    (c) sorting the waste material, from which the iron is separated during the step (b), according to a particle size of the waste material using a first oscillating multi-stage particle-size sorter;
    (d) secondarily crushing the waste material having a large particle size using an impact crusher after the sorting of the step (c);
    (e) separating the iron from the secondarily crushed waste material using a second magnetic sorter;
    (f) sorting the waste material, from which the iron is separated during the step (e), according to a weight of the waste material using a wind power sorter;
    (g) separating the iron from a light material separated during the step (f) using a third magnetic sorter; and
    (h) pulverizing the waste material, from which the iron is separated during the step (g), using a pulverizer to manufacture the solid fuel,
    wherein ferrous metals separated using the first, second, and third magnetic sorters during the steps (b), (e), and (g) are mixed with the waste material discharged from the first oscillating multi-stage particle-size sorter and are transported into a high-speed inertia pulverizer.

2. The method of claim 1, wherein a portion mixed with the ferrous metals is separated from the waste material, transported to the high-speed inertia pulverizer, using the high-speed inertia pulverizer.

3. The method of claim 1, wherein the waste material discharged from the high-speed inertia pulverizer is mixed with a heavy material, separated using the wind power sorter, and is sorted using a fourth magnetic sorter to select the ferrous metals.

4. The method of claim 3, wherein the waste material discharged from the fourth magnetic sorter is sorted using a nonferrous metal sorter to select nonferrous metals.

5. The method of claim 4, wherein the waste material discharged from the nonferrous metal sorter is sorted based on a predetermined particle size using a second oscillating multi-stage particle-size sorter, a portion of the waste material having a particle size smaller than the predetermined particle size is discharged as a residue, and a remaining portion of the waste material having a particle size larger than the predetermined particle size is mixed with the waste material discharged from the fourth magnetic sorter and is pulverized using a pulverizer to manufacture a solid fuel.

6. The method of claim 1, wherein the first oscillating multi-stage particle-size sorter is provided with a sieve having a predetermined size.

7. The method of claim 2, wherein the second oscillating multi-stage particle-size sorter is provided with another sieve that is smaller than the sieve of the first oscillating multi-stage particle-size sorter.

8. The method of claim 2, wherein the waste material discharged from the high-speed inertia pulverizer is mixed with a heavy material, separated using the wind power sorter, and is sorted using a fourth magnetic sorter to select the ferrous metals.

9. The method of claim 3, wherein the second oscillating multi-stage particle-size sorter is provided with another sieve that is smaller than the sieve of the first oscillating multi-stage particle-size sorter.

10. The method of claim 4, wherein the second oscillating multi-stage particle-size sorter is provided with another sieve that is smaller than the sieve of the first oscillating multi-stage particle-size sorter.

11. The method of claim 5, wherein the second oscillating multi-stage particle-size sorter is provided with another sieve that is smaller than the sieve of the first oscillating multi-stage particle-size sorter.

12. The method of claim 6, wherein the second oscillating multi-stage particle-size sorter is provided with another sieve that is smaller than the sieve of the first oscillating multi-stage particle-size sorter.

\* \* \* \* \*